Nov. 24, 1964 J. W. O'NEILL 3,158,382

CHUCK FACING PLATE ADAPTER

Filed March 11, 1963

INVENTOR.
JAMES W. O'NEILL
BY
Knox & Knox

United States Patent Office 3,158,382

Patented Nov. 24, 1964

3,158,382
CHUCK FACING PLATE ADAPTER

James W. O'Neill, 108 F St., San Diego, Calif.

Filed Mar. 11, 1963, Ser. No. 264,361
3 Claims. (Cl. 279—123)

The present invention relates generally to machine tools and more specifically to a chuck facing plate adapter.

Various machine tools such as a lathe, boring mill, or the like utilize a chuck with adjustable jaws to hold a part being machined, the jaws usually closing radially around the part. For practical purposes the jaws must protrude a certain distance from the face of the chuck so that, when facing a thin part, the jaws would extend beyond the part if the part were placed flat against the face plate. Thus thin parts to be faced must be spaced from the face plate so that the final cut is still clear of the jaws. Spacing blocks or simple gauges have been used to set up spacing, or even pins recessed into the chuck. Such arrangements are either temporary or required modification of the chuck and must be set up for each part or operation.

The primary object of this invention, therefore, is to provide a chuck facing plate adapted which can be quickly attached to a chuck to space a part from the face plate in accurate alignment.

Another object of this invention is to provide an adapter having interchangeable spacing inserts which can be installed to suit a particular part.

Another object of this invention is to provide an adapter which is self-aligning on the chuck and stays in place without any fastenings and without requiring modification to the chuck, yet is easily removed or replaced by another adapter for a different part or operation.

With these objects in view the invention consists in the novel structure and arrangement of parts as described in the specification, pointed out in the claims and illustrated in the drawing, which forms a material part of the disclosure and in which:

Similar characters of reference indicate similar or identical elements and portions throughout the specification and throughout the views of the drawing.

*Structure*

Figure 1:
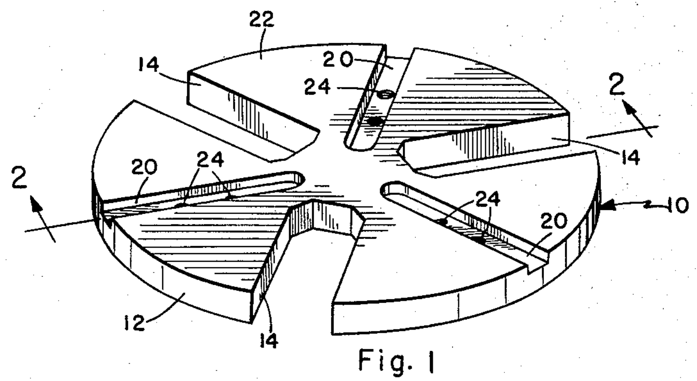
FIGURE 1 is a perspective view of the adapter plate.
Figure 2:
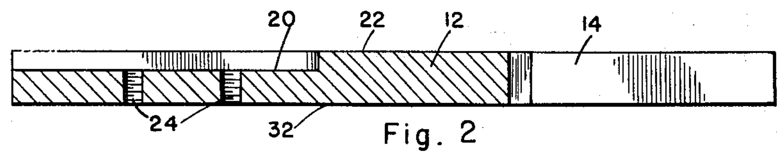
FIGURE 2 is an enlarged sectional view taken on line 2—2 of FIGURE 1.
Figure 3:
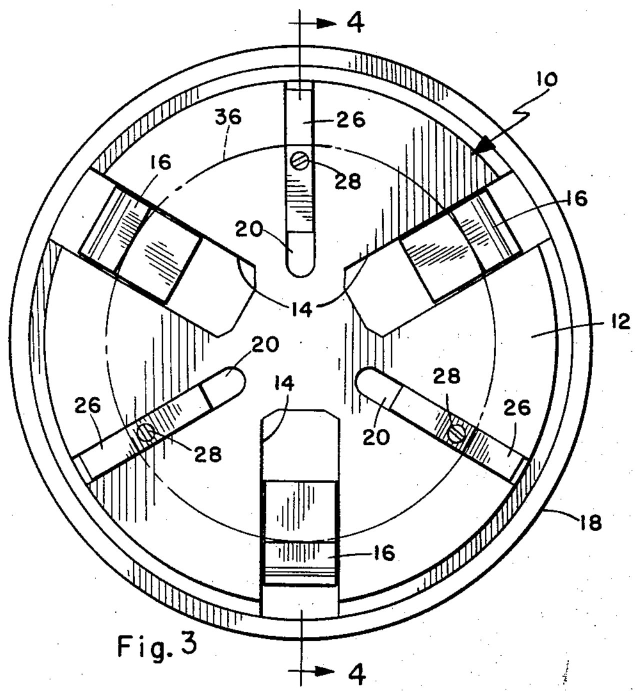
FIGURE 3 is a front elevation view of the adapter, with inserts in place, attached to a chuck.

The adapter 10 comprises a plate 12, preferably in the form of a disc as illustrated, which is the most convenient shape for use on rotary tools, said disc having radially inwardly extending slots 14 open at their outer ends. The slots 14 are positioned to fit closely over the adjustable jaws 16 of a chuck 18, as in FIGURES 3 and 4, so that the adapter plate 12 is retained and automatically aligned and centered by the jaws. Three slots 14 are indicated to fit a conventional three jaw chuck, but any number may be used to suit particular chucks with other than three jaws. Between the slots 14 are radially extending grooves 20 in the front face 22 of adapter plate 12, each groove having one or more threaded sockets 24 through the plate.

Seated in grooves 20 are spacer inserts 26 held by suitable screws 28 threaded into sockets 24, the heads of said screws being flush with or countersunk below the front support faces 30 of said inserts. The spacer inserts 26 are illustrated as simple rectangular blocks, but may be of other shapes depending on the part to be supported.

*Operation*

The adapter plate 12 is fitted over the chuck jaws 16 and seated with its flat rear face 32 against the face 34 of chuck 18. Since all conventional chucks have at least three jaws the adapter plate will be automatically centered and held against shifting eccentrically. A work piece or part 36 to be faced is inserted between jaws 16 and clamped in place by the jaws, the rear face of the part resting on the support faces 30 of spacer inserts 26, as in FIGURE 4.

Figure 4:
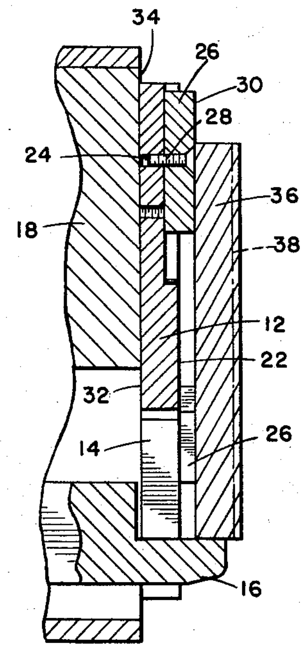
FIGURE 4 is a sectional view taken on line 4—4 of FIGURE 3.

The thickness of spacer inserts 26 is sufficient that the line of finished cut, indicated at 38 in FIGURE 4, will not be undesirably close to the jaws 16. Spacer inserts 26 are readily interchangeable to provide the proper thickness for any particular part and could be of unequal thicknesses to fit a part with other than a flat rear face.

By clamping the part 36 in place, the adapter plate 12 is held firmly against the chuck 18 and the part is supported accurately parallel to the chuck face. It will be obvious, however, that by use of special inserts, the part can be held at an inclined position for certain operations. In any event the set up is consistent for successive parts and ensures uniform accuracy for a large number of parts, as in a production run. No gauging or shimming of parts is necessary, the adapter providing positive assurance that the prescribed facing operation can be completed safely without damage to tools or the chuck jaws.

For different operations, adapters may be made up with different sets of spacer inserts 26 and stored as actual tools for specific operations. It is a very simple matter to lift off one adapter and replace it with another, since no screws, clamps, or other attachments are used and no alignment procedure is necessary. For this reason the adapter can be used with virtually any chuck of a lathe, boring mill, or similar machine, without modification of the chuck or any other part of the machine.

It is understood that minor variation from the form of the invention disclosed herein may be made without departure from the spirit and scope of the invention, and that the specification and drawings are to be considered as merely illustrative rather than limiting.

I claim:

1. A chuck jaws adapter for spacing a work piece from the face of a chuck having adjustable jaws to hold the work piece, comprising:

an adapter plate engageable against the face of a chuck and having slots extending substantially radially therein, the sides of said slots being parallel and adapted to snugly receive the chuck jaws whereby said adapter plate is self centering on said chuck;

said adapter plate having spacing elements of selected thickness removably secured thereto and extending substantially perpendicularly relative to the chuck face to engage and support a work piece.

2. A chuck jaws adapter for spacing a work piece from the face of a chuck having radially adjustable jaws to hold the work piece, comprising:

an adapter plate engageable against the face of the chuck and having radial slots, the sides of said slot being parallel to snugly receive the chuck jaws and be aligned thereby;

said adapter plate having spacing elements of selected thickness removably secured thereto and extending substantially perpendicularly relative to the chuck face to engage and support a work piece.

3. A chuck jaws adapter for spacing a work piece from the face of a chuck having radially adjustable jaws to hold the work piece, comprising:

an adapter plate engageable against the face of the chuck and having radial slots, the sides of said slot being parallel to snugly receive the chuck jaws and be aligned thereby;

said adapter plate having grooves in the face thereof remote from the chuck face when the adapter is in use;

and spacer inserts of selected thickness removably secured in said grooves to engage and support a work piece.

References Cited in the file of this patent

UNITED STATES PATENTS

| | | |
|---|---|---|
| 2,488,822 | McDonald | Nov. 22, 1949 |
| 2,524,006 | Capellazzi | Sept. 26, 1950 |
| 2,842,371 | Kersten | July 8, 1958 |
| 3,032,347 | Cambron | May 1, 1962 |

FOREIGN PATENTS

| | | |
|---|---|---|
| 684,401 | Germany | Nov. 27, 1939 |